United States Patent
Groth

[11] 3,889,026
[45] June 10, 1975

[54] HEAT-REFLECTING PANE

[75] Inventor: Rolf Groth, Witten, Germany

[73] Assignee: BFG Glassgroup, Paris, France

[22] Filed: Nov. 5, 1973

[21] Appl. No.: 412,985

[30] Foreign Application Priority Data
Nov. 17, 1972 Germany............................ 2256441

[52] U.S. Cl. ............... 428/34; 117/33.3; 117/35 V;
117/71 R; 117/124 B; 350/1; 428/336;
428/433; 428/437; 428/469
[51] Int. Cl......................... B32b 17/06; B32b 1/04
[58] Field of Search ........... 161/165, 225, 196, 199,
161/45, 1, 4; 350/1, 258, 259, 276 R; 117/71
R, 35 V, 124 B, 33.3

[56] References Cited
UNITED STATES PATENTS

| | | | |
|---|---|---|---|
| 2,482,054 | 9/1949 | Colbert................................ | 161/225 |
| 2,581,632 | 1/1952 | Colbert................................ | 161/225 |
| 2,628,927 | 2/1953 | Colbert................................ | 161/225 |
| 2,676,117 | 4/1954 | Colbert................................ | 161/225 |
| 3,069,301 | 12/1962 | Buckley............................. | 161/196 |
| 3,290,203 | 12/1966 | Antonson............................ | 161/214 |
| 3,516,720 | 6/1970 | Mauer................................. | 161/196 |
| 3,537,944 | 11/1970 | Grubb................................. | 161/196 |

*Primary Examiner*—George F. Lesmes
*Assistant Examiner*—Ellis P. Robinson

[57] ABSTRACT

A heat-reflecting pane comprises a sheet of transparent material having a coating in the form of a light-transmitting silver layer applied over a dielectric layer, the dielectric layer being absorption-free for visible light and having a refractive index greater than 2. The thickness of the silver layer is between 140 and 240 A, preferably between 160 and 220 A, and the thickness of the dielectric layer is between 400 and 600 A, preferably between 440 and 560 A. In one particular embodiment, the silver layer has a thickness of 190 A and the dielectric layer is a zinc sulphide layer having a thickness of 500 A. The heat-reflecting pane may be connected to another pane by an adhesive layer to form a safety glazing laminate having heat-reflecting properties, or may be supported in spaced apart relationship to another pane to form a double-glazing unit in which the coated surface of the heat-reflecting pane is adjacent the gap between the panes.

11 Claims, 5 Drawing Figures

HEAT-REFLECTING PANE

BACKGROUND OF THE INVENTION

This invention relates to a heat-reflecting pane comprising a transparent support sheet, a light-transmitting silver layer applied to the transparent support sheet, and a dielectric layer which is disposed between the support sheet and the silver layer, such dielectric layer being absorption-free or at least low in absorption for visible light and having a refractive index greater than 2.

Various constructions for heat-reflecting panes are known. For instance, it is known to coat glazing sheets with layers of metals of high infra-red reflecting capacity, for instance, layers of gold, copper, silver or aluminum. These layers have the property of transmitting the visual component of solar radiation to a greater extent than the infra-red component thereof, which is mainly reflected. Heat-reflecting panes of this kind have therefore been used successfully in the glazing of buildings or vehicles to protect their interiors against excessive solar radiation.

However, these known panes have various disadvantages. For instance, in outward appearance panes provided with coatings of gold or copper have a strongly yellowish or reddish tint. One result of this is that, due to a changed spectral composition, the solar radiation reflected by them can cause undesirable colouring effects, for instance, if the light is reflected into the windows of buildings opposite. Another result is that panes of this kind are in many cases unacceptable for architectural reasons, since to an ever increasing extent demands are made for heat-reflecting window panes which exhibit a neutral colour when viewed from outside, so that they can be used with differently coloured facade elements. There is also the fact that gold and copper layers suffer colour shifts when viewed from inside the building and are therefore not neutral when looked through either.

It is true that the external appearance of panes having silver and aluminium layers is neutral in colour if the layers are thick enough, but in that case, when viewed from inside they have a strong blue tinge. It is true that thinner layers impose less of a blue tinge on the transmitted light, although this aspect remains a disturbing one, but in outside appearance they have a considerable yellow tinge.

It has also been suggested to combine metal layers of high infra-red reflecting capacity with dielectric layers, the metal layer being sandwiched between anti-reflection layers of this kind made of a material with a high refractive index (of. German Offenlegungsschrift No. 1,596,825). By means of this layer structure which corresponds to an interference filter, the light transmission of a gold layer can be successfully raised from about 36 to about 70 percent, the high reflecting capacity in the infra-red remaining identical in both cases (of. German Auslegeschrift No. 1,421,872). The antireflection effect of the dielectric layers considerably reduces the reflective capacity of the gold layer over the visible range, and when looked at from the outside (from the glass side) a pane coated in this way has a grey-blue appearance, instead of the intensive gold tone of the single gold layer. When looked through these panes have an umber tint. Heat-reflecting panes of this kind therefore fail to meet requirements as regards neutral tint when viewed from outside and when looked through. There is also the fact that high light transmission is undesirable for many applications, more particularly in the case of large glazed areas in large office premises. In such cases heat-reflecting panes are required with a light transmission in the range of about 30–45 percent and a correspondingly high solar heat insulation, although it must be remembered that about 45 percent of the total solar radiation, and therefore a corresponding proportion of the heat energy passing into the closed space through the pane, fall within the visible region of the spectrum.

Moreover, to obtain satisfactory heat insulation, reduction of visible proportion of the radiation to the required light transmission level should be by reflection and not by absorption, since absorption heats the pane, so that thereafter a substantial proportion of the absorbed radiant energy is delivered to the inside of the premises. Medium reflective capacity in the visible zone of the spectrum is also advantageous from the architectural point of view, so that the window panes do not give the effect of dark, as it were, dead elements, which make no contribution to the facade design.

SUMMARY OF THE INVENTION

It is an aim of the invention to provide a heat-reflecting pane which has a high infra red reflecting capacity and a light transmission, related to the brightness sensitivity of the human eye, of 30–45 percent, and which is neutral in colour both when viewed from outside and also when looked through, the reflective capacity in the visible zone of the spectrum being substantially higher than that of a clear glass pane.

Accordingly, the present invention provides a heat-reflecting pane comprising a transparent support sheet, a light-transmitting silver layer applied to the transparent support sheet, and a dielectric layer disposed between the support sheet and the silver layer, such dielectric layer being absorption-free or at least low in absorption for visible light and having a refractive index greater than 2, in which pane the thickness of the silver layer is between 140 and 240 A, and the thickness of the dielectric layer is between 400 and 600 A.

With the proposed values for the layer thicknesses neutrality of colour can be achieved both when the glass is looked through and in reflection. Particularly satisfactory values are obtained with a dielectric layer of zinc sulphide of 500 A thickness and a silver layer of 190 A thickness. Panes embodying the invention, whilst neutral in colour when looked through and viewed from the outside, have a reflective capacity of total solar radiation of about 50 percent (with a silver layer of 190 A and a ZnS layer of 500 A) and a light transmission, related to the brightness-sensitivity of the human eye, of about 40 percent. This result is surprising because, although it is known that a dielectric layer can alter the spectral reflection and transmission curves of a metal layer, it is surprising that the use of particular materials and the adaptation of the layer thicknesses can successfully produce a heat-reflecting pane which exhibits a neutral colour both when looked through and when looked at from the outside (viewed from the transparent support sheet).

The layers can be produced by known processes, for instance, by cathode atomization or by applying the layers by vaporization in vacuo.

Since in normal atmospheric conditions silver layers are not stable for long, a protective layer, preferably a transparent lacquer, can be applied to the silver layer. Layers of this kind and their preparation are known and therefore require no further explanation.

A heat-reflecting pane embodying the invention can be connected by an adhesive intermediate layer to a further sheet of glass or transparent plastics to form a safety glazing laminate in which the coating of the heat-reflecting pane is adjacent to the adhesive layer.

Finally, a pane embodying the invention can be combined with a further pane such as a glass sheet to form an insulating double-glazing unit in which the coated layer of the heat-reflecting pane is disposed adjacent to the air gap between the panes.

BRIEF DESCRIPTION OF THE DRAWINGS

In order that the invention may be readily understood, embodiments thereof will now be described in more detail, by way of example, with reference to the accompanying drawings, in which.

DESCRIPTION OF PREFERRED EMBODIMENTS

Figure 1:
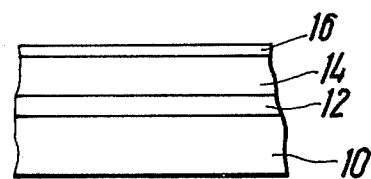
FIG. 1 illustrates a first embodiment of the heat-reflecting pane according to the invention.

In the heat-reflecting pane illustrated in FIG. 1, a zinc sulphide layer 12 of 500 A and a silver layer 14 of 190 A are applied by vaporization to a clear glass support sheet 10 having a thickness of 5 mm. The side of the silver layer 14 remote from the glass sheet is protected by a protective layer 16 of transparent lacquer.

Figure 2:
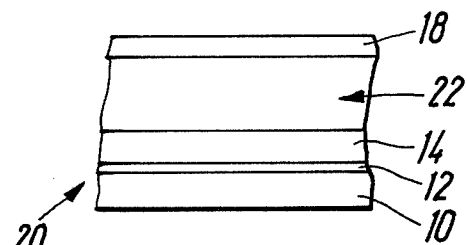
FIG. 2 illustrates a double-glazing unit in which one of the individual panes is a heat-reflecting pane embodying the invention.

FIG. 2 shows a double-glazing unit consisting of a clear glass sheet 18 and a heat-reflecting pane 20 of the kind illustrated in FIG. 1, the sheet 18 and pane 20 being supported in spaced-apart relationship by connecting means (not shown). As illustrated, the silver layer 14 adjacent an air gap 22 of the double-glazing unit is not covered by a protective layer, but one can be provided.

Figure 3:
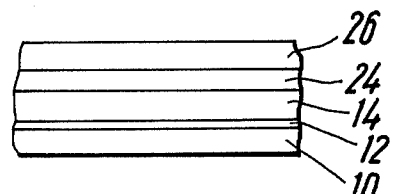
FIG. 3 illustrates a safety glass laminate which incorporates a heat-reflecting pane embodying the invention.

In the safety glass laminate illustrated in FIG. 3, a covering sheet 26 is glued by means of a polyvinyl butyral layer 24 on to a heat-reflecting pane consisting of a clear glass sheet 10, a zinc sulphide layer 12 and a silver layer 14. In this laminate the sheets 10 and 26 form the outermost layers.

Figure 4:
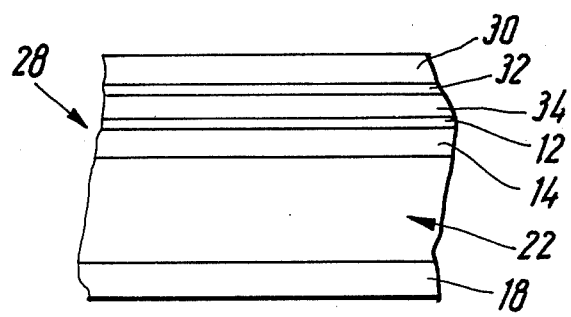
FIG. 4 illustrates a double-glazing unit including a safety glass laminate incorporating a heat-reflecting pane embodying the invention, such heat-reflecting pane being disposed adjacent the gap between the individual panes of the unit.

FIG. 4 shows a double-glazing unit consisting of a clear glass sheet 18 and a safety glass laminate 28 supported in spaced-apart relationship. The laminate 28 comprises a first clear glass sheet 30 joined to a second clear glass sheet 34 by a polyvinyl butyral layer 32, the sheet 34 bearing on its side adjacent the air gap 22 a heat-reflecting coating comprising a zinc sulphide layer 12 and a silver layer 14 similar to those borne by the sheet 10 of the foregoing embodiments.

Of course, in all the embodiments, the glass sheets can be replaced by sheets of other transparent material, for example, a plastics material.

The manufacture of an exemplary double-glazing unit embodying the invention will now be described.

A zinc sulphide layer of 500 A thickness was applied to a clear glass sheet of 5 mm thickness at a pressure of $5 \cdot 10^{-5}$ of Torr in a high vacuum vaporization installation. A silver layer of 190 A was then applied by vaporization to the zinc sulphide layer. The resulting heat-reflecting pane was connected to a clear glass pane of 5 mm thickness to form a double glazing unit of the kind illustrated in FIG. 2, with the coated surface of the heat-reflecting pane adjacent the air gap. The resulting double-glazing unit has the following optical properties:

Light transmission: (related to the brightness-sensitivity of the human eye): 36%
Transmission: for total solar radiation: 22%
Reflective capacity: for total solar radiation (coated pane nearest the radiation source): 50.5%

Instead of a zinc sulphide layer, a layer of cerium dioxide, titanium dioxide or bismuth oxide can be used.

Figure 5:
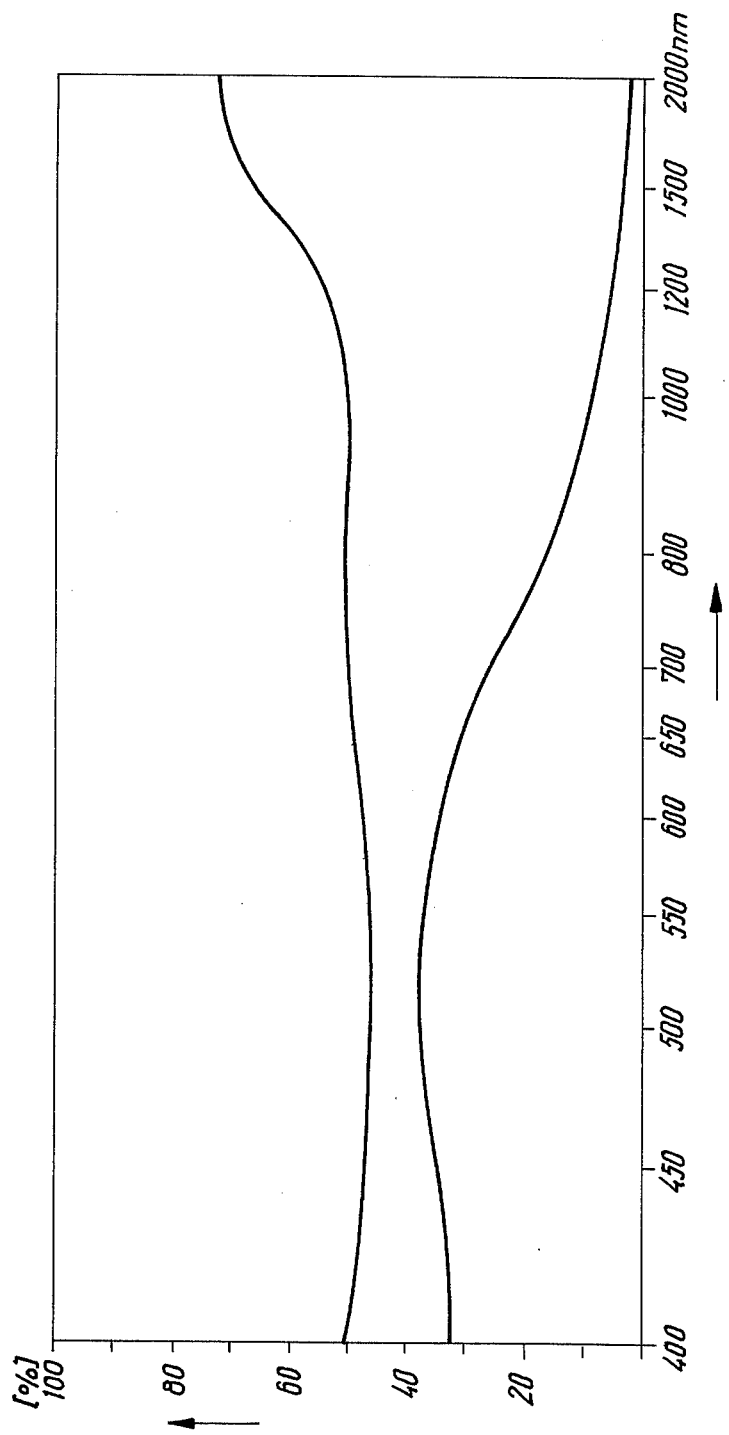
FIG. 5 is a graph illustrating the spectral transmission and reflection curves of the double-glazing unit illustrated in FIG. 2.

In FIG. 5 the spectral transmission curve and the spectral reflection curve of a heat reflecting double glazing unit are reproduced, the wavelength being plotted on the abscissa and the transmission and reflection values on the ordinate. When the curves were plotted, the pane of the double glazing unit which was provided with the heat reflecting coating in accordance with the invention was facing the source of radiation.

The spectral transmission and reflection curves represented in FIG. 5 show that, when a heat reflecting coating of the invention is used, in the infrared portion of the spectrum, say, above 750 nm, the transmittancy is poor, that is, most of the radiation in the infrared region is reflected. To this is to be attributed the good heat reflecting action of the pane of the invention.

Also in the visible portion of the spectrum, at, for example, 550 nm (maximum brightness sensitivity of the human eye), the reflectivity, as shown by FIG. 5, is relatively high, so that the predominant part of the visible radiation that is not transmitted through the pane is also reflected, not absorbed, which reduces the heat load on the room equipped with such glazing.

The spectral reflection and the transmission are largely constant in the visible region, i.e., between 450 and 600 nm in FIG. 5, for example, which means that both the outward appearance and the appearance from the inside are virtually color-neutral. The drop-off of the transmission curve in the wavelength region around 700 nm towards the infrared is at the same time in a region which contributes little to the color vision of the human eye.

To make a quantitative assessment of colour neutrality, the colour values in reflection and transmission were calculated from the spectral curves shown in FIG. 5, in accordance with DIN 5033, Sheet 4. The calculations were carried out for standardized light type C (artificial daylight) with the standardized colour value proportions $x_c = 0.310$ and $y_c = 0.316$. The following standardized colour value proportions $x$, $y$ and colour shifts $\Delta x = x - x_c$, $\Delta y = y - y_c$ were obtained in comparison with the standardized colour value proportions of the reference light source:

in transmission: $x = 0.305$   $\Delta x = -0.005$
$y = 0.323$   $\Delta y = 0.007$
in reflection: $x = 0.312$   $\Delta x = +0.002$
$y = 0.315$   $\Delta y = -0.001$ The colour shifts present are therefore so slight that they can be ignored for all practical applications. When the glass is looked through its colour neutrality is comparable with that of a corresponding double clear glass unit, for which the following standardized colour value proportions are calculated in transmission:

$x = 0.308$   $\Delta x = -0.002$
$y = 0.319$   $\Delta y = +0.003$

In contrast, in the case of heat-reflecting panes of the kind specified hereinbefore the corresponding divergencies are higher by a factor of 2–3.

Heat-reflecting panes embodying the invention can therefore be employed even in cases for which genuine colour reproduction is required when the glass is looked through, for instance, for clinics, schools and factory buildings, in which products are tested for uniformity of colour.

I claim:

1. Heat-reflecting pane consisting essentially of a transparent layer support, a light-transmitting silver layer applied to the transparent layer support, and a dielectric layer selected from the group consisting of zinc sulfide, cerium dioxide, titanium oxide and bismuth oxide that is absorption-free or at least of low absorption for visible light, disposed between the layer support and the silver layer and having a refractive index greater than 2, characterized in that, for the achievement of color neutrality both upon viewing from the inside and upon viewing from the outside, the thickness of the silver layer is between 140 and 240 A and the thickness of the dielectric layer is between 400 and 600 A.

2. Heat-reflecting pane of claim 1, characterized in that the thickness of the silver layer is between 160 and 220 A.

3. Heat-reflecting pane of claim 1, characterized in that the thickness of the dielectric layer is between 440 and 560 A.

4. Heat-reflecting pane of claim 1, characterized in that the silver layer has a thickness of 190 A and zinc sulfide is used as the dielectric layer and has a thickness of 500 A.

5. Heat-reflecting pane of claim 1, characterized in that the silver layer is provided on the side averted from the dielectric layer with a protective layer.

6. Heat-reflecting pane of claim 5, characterized in that the protective layer consists of a transparent lacquer.

7. A safety laminate pane comprising at least two panes joined by an adhesive interlayer, of which at least one is the heat-reflecting pane of claim 1 and is so disposed that the silver layer faces the adhesive interlayer.

8. A safety laminate pane of claim 7, the panes being glass panes.

9. A safety laminate pane of claim 7, wherein at least one pane consists of plastic.

10. A double-glazing unit comprising at least two panes in spaced apart relationship, of which at least one is the heat-reflecting pane of claim 1 whose coated side faces the gap between the panes.

11. A double-glazing unit of claim 10 wherein at least one of the panes being a laminated safety pane and having at least one pane bearing the said heat-reflecting coating on the side facing said gap.

* * * * *